United States Patent
Tsuchiya et al.

(10) Patent No.: US 9,825,289 B2
(45) Date of Patent: Nov. 21, 2017

(54) STABILIZED LITHIUM POWDER, AND NEGATIVE ELECTRODE AND LITHIUM ION SECONDARY BATTERY USING THE SAME

(71) Applicant: TDK CORPORATION, Tokyo (JP)

(72) Inventors: Masahiro Tsuchiya, Tokyo (JP); Tomohiko Hasegawa, Tokyo (JP); Yuji Yamamoto, Tokyo (JP); Kazuma Akimoto, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 14/960,964

(22) Filed: Dec. 7, 2015

(65) Prior Publication Data

US 2017/0062811 A1   Mar. 2, 2017

(30) Foreign Application Priority Data

Aug. 27, 2015   (JP) .................................. 2015-167608

(51) Int. Cl.
*H01M 4/36* (2006.01)
*H01M 10/0525* (2010.01)
*H01M 4/38* (2006.01)
*H01M 8/0637* (2016.01)

(52) U.S. Cl.
CPC ............ *H01M 4/366* (2013.01); *H01M 4/38* (2013.01); *H01M 4/382* (2013.01); *H01M 8/0637* (2013.01); *H01M 10/0525* (2013.01)

(58) Field of Classification Search
None
See application file for complete search history.

(56) References Cited

U.S. PATENT DOCUMENTS

| | | | |
|---|---|---|---|
| 6,740,454 B1 | 5/2004 | Ando et al. | |
| 2008/0070120 A1 | 3/2008 | Miyawaki et al. | |
| 2011/0274977 A1* | 11/2011 | Nakura ................. | C01G 53/00 429/223 |
| 2014/0057173 A1* | 2/2014 | Jeong ................... | H01M 4/366 429/219 |
| 2015/0147655 A1* | 5/2015 | Park ..................... | H01M 4/485 429/231.1 |

FOREIGN PATENT DOCUMENTS

| | | |
|---|---|---|
| JP | 4126157 B2 | 7/2008 |
| JP | 5196118 B2 | 5/2013 |

* cited by examiner

*Primary Examiner* — Patrick Ryan
*Assistant Examiner* — Christopher Domone
(74) *Attorney, Agent, or Firm* — Oliff PLC

(57) ABSTRACT

Stabilized lithium powder according to an embodiment of this disclosure contains lithium particles and transition metal. Each lithium particle has a stabilized film on a surface thereof; the stabilized film contains an inorganic compound; and main transition metal, which is contained the most in the transition metal, is contained by $0.5 \times 10^{-3}$ wt % or more and $11.5 \times 10^{-3}$ wt % or less.

15 Claims, 2 Drawing Sheets

STABILIZED LITHIUM POWDER, AND NEGATIVE ELECTRODE AND LITHIUM ION SECONDARY BATTERY USING THE SAME

BACKGROUND

1. Technical Field

The present disclosure relates to stabilized lithium powder, a negative electrode using the stabilized lithium powder, and a lithium ion secondary battery using the stabilized lithium powder.

2. Related Art

An electrochemical device typified by a lithium ion secondary battery, whose positive electrode employs a lithium-containing transition metal oxide typified by lithium cobaltate and whose negative electrode employs a carbon material capable of being doped and de-doped with lithium, has a characteristic feature of high energy density. Due to this feature, such an electrochemical device is important as a power source for a portable electronic appliance typified by a mobile phone. Along with the rapid spread of the portable electronic appliances, the demand for the lithium ion secondary battery has been increasing.

A number of eco-friendly vehicles including hybrid vehicles have been developed. As a power source to be mounted on the hybrid vehicle, a lithium ion secondary battery with high energy density has attracted attention.

The capacity of the lithium ion secondary battery mainly depends on an electrode active material. As a negative electrode active material, graphite is typically used. To meet the above demand, however, it is necessary to use a negative electrode active material with higher capacity. In view of this, metal silicon (Si) with much higher theoretical capacity (4210 mAh/g) than that of graphite (372 mAh/g) has attracted attention.

One of the known means for improving the performance of the lithium ion secondary battery is a pre-doping technique. According to this technique, mainly the negative electrode of the lithium ion power storage device is doped with lithium ions in advance, so that the irreversible capacity of the electrode in the lithium ion power storage device can be suppressed.

For example, Japanese Patent No. 4126157 discloses a vertical pre-doping method in which a holed foil with a penetration hole is used as a current collector. In the vertical pre-doping method, in addition to a positive electrode and a negative electrode, a third electrode is used for supplying lithium ions to the positive electrode and the negative electrode.

A fabrication process with the vertical pre-doping method is more complicated than a normal fabrication process for the lithium ion power storage device, and therefore requires more time and cost for fabricating the device. In another technique, a lithium foil is used for the entire positive electrode mixture layer and negative electrode mixture layer. However, lithium is so soft that it is very difficult to attach the lithium foil evenly on the electrode mixture layer. Moreover, it is difficult to handle the lithium foil in this work, so that the mass productivity may be affected.

For solving those problems, a method of using lithium powder has been suggested in Japanese Patent No. 4126157. According to this method, a dispersion solution obtained by dispersing the lithium powder in a solution is applied on a negative electrode active material, thereby conducting pre-doping. Moreover, in the disclosure, the stabilized film is formed on the surface of the powder particle included in the lithium powder used in the pre-doping for the purpose of increasing the stability (stabilized lithium powder). However, the reliability of the battery using the stabilized lithium powder in a long-term cycle has not been clarified sufficiently. Further improvement has been desired.

SUMMARY

Stabilized lithium powder according to an embodiment of this disclosure contains lithium particles and transition metal. Each lithium particle has a stabilized film on a surface thereof; the stabilized film contains an inorganic compound; and main transition metal, which is contained the most in the transition metal, is contained by $0.5 \times 10^{-3}$ wt % or more and $11.5 \times 10^{-3}$ wt % or less.

DETAILED DESCRIPTION

Figure 1:
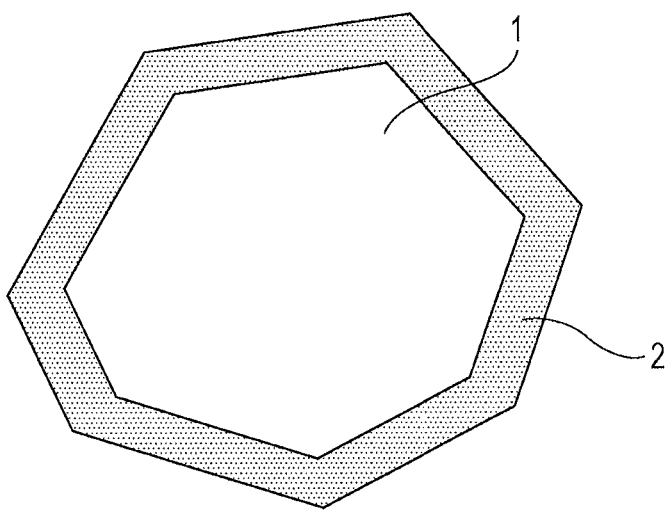
FIG. 1 is a schematic sectional view illustrating stabilized lithium powder according to an embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

As a result of concerted studies, the present researchers have found out that the impurities, which are generated from the long operation of the battery, are generated more by the stabilized film included in the lithium powder and the generated impurities deteriorate the cycle characteristic of the battery.

The present disclosure has been made in view of the above problem of the conventional technique. An object of the present disclosure is to provide stabilized lithium powder that can be used for a lithium secondary battery with excellent cycle characteristics, and a negative electrode and a lithium ion secondary battery using the stabilized lithium powder.

To solve the above problem, stabilized lithium powder according to the present disclosure contains lithium particles and transition metal. Each lithium particle has a stabilized film on a surface thereof; the stabilized film contains an inorganic compound; and main transition metal, which is contained the most in the transition metal, is contained by $0.5 \times 10^{-3}$ wt % or more and $11.5 \times 10^{-3}$ wt % or less.

According to this aspect, the increase in battery resistance, which is considered to be caused by the lithium carbonate and the polymer compound included in the stabilized film of the conventional stabilized lithium powder, is suppressed by having the main transition metal contained in the stabilized lithium powder (hereinafter referred to as "lithium powder" as appropriate) by a predetermined proportion. This can suppress the deterioration in battery resistance and improve the cycle characteristic of the battery by the operation of the transition metal.

The main transition metal included in the stabilized lithium powder according to the present disclosure may be Fe.

With the lithium powder, it is possible to effectively suppress the deterioration in battery resistance when the transition metal is Fe. Thus, the battery can have the higher cycle characteristic.

The stabilized lithium powder according to the present disclosure includes Fe and Sr, and the ratio of the content of Fe to Sr (Fe/Sr) in the stabilized lithium powder may be in the range of 0.21 or more and 2.51 or less.

The lithium ion secondary battery according to the present disclosure includes a negative electrode including the deposited stabilized lithium powder, a positive electrode, a separator held between the negative electrode and the positive electrode, and an electrolyte solution.

The lithium ion secondary battery as above has excellent cycle characteristics.

According to the present disclosure, the stabilized lithium powder that can be used for the lithium secondary battery with excellent cycle characteristics can be provided. In addition, the negative electrode and the lithium ion secondary battery using the stabilized lithium powder can be provided.

An embodiment of the present disclosure will be hereinafter described. The embodiment of the present disclosure is not limited to the embodiment described below.

(Lithium Ion Secondary Battery)

Figure 2:
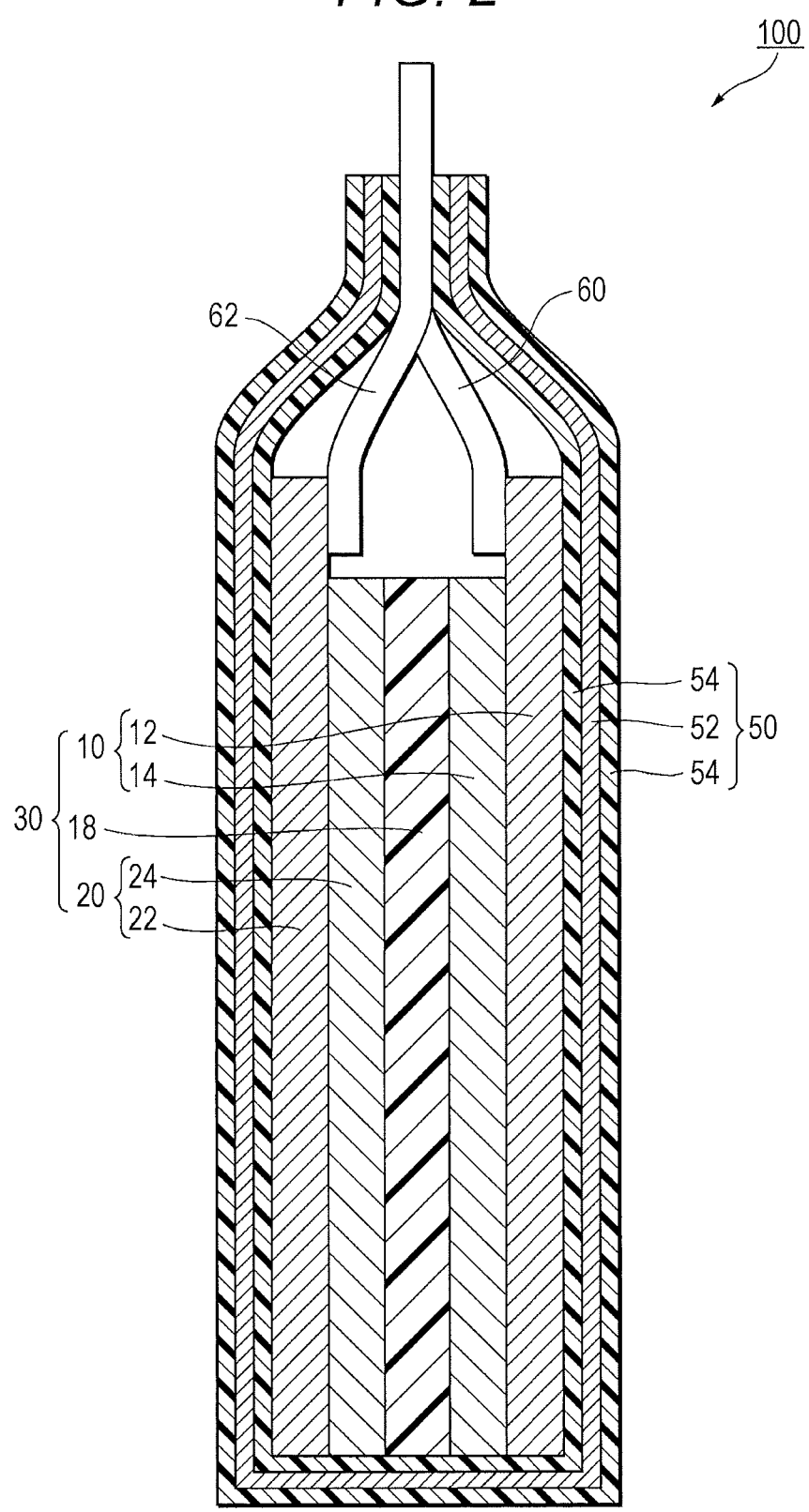
FIG. 2 is a schematic sectional view illustrating a lithium ion secondary battery according to the embodiment.

As illustrated in FIG. 2, a lithium ion secondary battery 100 according to the embodiment includes a power generation element 30, an electrolyte solution including lithium ions, and a case 50 housing them in a sealed state. Here, the power generation element 30 includes a plate-shaped negative electrode 20 and a plate-shaped positive electrode 10, which are provided opposite to each other, and a plate-shaped separator 18 interposed between the negative electrode 20 and the positive electrode 10. The lithium ion secondary battery 100 moreover includes a negative electrode lead 62 and a positive electrode lead 60. Here, the negative electrode lead 62 has one end electrically connected to the negative electrode 20 and has the other end projecting out of the case. Moreover, the positive electrode lead 60 has one end electrically connected to the positive electrode 10 and has the other end projecting out of the case.

The negative electrode 20 includes a negative electrode current collector 22, and a negative electrode active material layer 24 formed on the negative electrode current collector 22. The positive electrode 10 includes a positive electrode current collector 12, and a positive electrode active material layer 14 formed on the positive electrode current collector 12. The separator 18 is disposed between the negative electrode active material layer 24 and the positive electrode active material layer 14.

<Positive Electrode>

(Positive Electrode Current Collector)

The positive electrode current collector 12 can be formed of any conductive plate-shaped material. Examples of the applicable positive electrode current collector include metal thin plates (metal foils) of aluminum, alloy including aluminum, and stainless steel.

(Positive Electrode Active Material Layer)

The positive electrode active material layer 14 mainly includes a positive electrode active material, a positive electrode binder, and a necessary amount of positive electrode conductive auxiliary agent.

(Positive Electrode Active Material)

The positive electrode active material is not particularly limited as long as the positive electrode active material is capable of intercalation or deintercalation of lithium ions, and reversible doping and de-doping of the lithium ions and a counter anion (such as $PF_6^-$) of the lithium ions. For example, known electrode active materials can be used. Specific examples of the positive electrode active material include lithium cobaltate ($LiCoO_2$), lithium nickelate ($LiNiO_2$), lithium manganese spinel ($LiMn_2O_4$), a composite metal oxide represented by general formula: $LiNi_xCo_yMn_zMaO_2$ (x+y+z+a=1, 0≤x≤1, 0≤y≤1, 0≤z−1, 0≤a≤1, where M is one or more kinds of elements selected from Al, Mg, Nb, Ti, Cu, Zn, and Cr), a lithium vanadium compound ($LiV_2O_5$), olivine $LiMPO_4$ (where M is one or more kinds of elements selected from Co, Ni, Mn, Fe, Mg, Nb, Ti, Al, and Zr, or VO), lithium titanate ($Li_4Ti_5O_{12}$), $LiNi_xCo_yAl_zO_2$ (0.9<x+y+z<1.1), and other composite metal oxides.

(Positive Electrode Binder)

The positive electrode binder is not particularly limited. The binder similar to a negative electrode binder to be described below can be used.

(Positive Electrode Conductive Auxiliary Agent)

The positive electrode conductive auxiliary agent is not particular limited. The conductive auxiliary agent similar to a negative electrode conductive auxiliary agent to be described below can be used.

<Stabilized Lithium Powder>

As illustrated in FIG. 1, the lithium particle 1 included in the stabilized lithium powder according to the embodiment has a stabilized film 2 containing an inorganic compound on a surface of the particle 1. In the stabilized lithium powder, the transition metal is contained by $0.5 \times 10^{-3}$ wt % or more and $11.5 \times 10^{-3}$ wt % or less relative to the entire stabilized lithium powder.

Conventionally, the increase in battery resistance has been observed and this increase is considered to be caused by, for example, lithium carbonate or polymer included in the stabilized film of the stabilized lithium powder. However, the deterioration in battery resistance can be suppressed when the transition metal is contained in the lithium powder by a predetermined proportion. It is considered that the cycle characteristic is improved by the operation of the valence change of the transition metal.

The transition metal may be, for example, Ti, V, Mn, Fe, Co, Cr, or Ni. Above all, Ti, V, Mn, or Fe, particularly Fe can be used.

The transition metal may be included in the stabilized film of the stabilized lithium powder. The transition metal may be the metal exhibiting the electric conductivity. The transition metal may exist not just as the single metal but as a compound. From the viewpoint of the stability of the material, the transition metal may be contained in the lithium powder as a compound containing oxygen. An example of such a compound is an oxide. Such transition metal may be, particularly, the transition metal with a large ionizing tendency. Specifically, the metal with a Gibbs free energy of −0.40 or less (Li has a Gibbs free energy of −3.0) can be used. Above all, the content of Fe may be controlled because the amount of Fe affects the cycle characteristic of the battery.

For suppressing the deterioration in battery resistance more effectively, the lithium powder according to the present disclosure may contain one or more kinds of metal selected from Mg, Ca, and Sr, and may particularly contain Sr. Sr or the like may be contained in the stabilized film like Fe.

Sr is contained in the range of $0.4 \times 10^{-3}$ wt % or more and $20 \times 10^{-3}$ wt % or less in the stabilized lithium powder.

In addition, when the stabilized lithium powder contains Fe and Sr, the ratio of the content of Fe to Sr (Fe/Sr) may be in the range of 0.21 or more and 2.51 or less.

The lithium particles may have an average particle size of 1 to 200 μm. In an example of a measurement method for stably measuring the stabilized lithium particles, an optical microscope, an electronic microscope and a particle size distribution analyzer can be used under an inert atmosphere such as inert gas or hydrocarbon oil. Above all, the measurement with use of the optical microscope is preferable.

The stabilized film may contain lithium oxide as a main component.

The amount of lithium oxide may be of such a degree that the lithium oxide can cover the lithium particles. The amount of lithium oxide may be 0.5 wt % or more and 10 wt % or less, particularly 1.0 wt % or more and 5.0 wt % or less, relative to the entire weight of the stabilized lithium powder. When the amount of lithium oxide is in this range, the loss of the negative electrode due to the heat generation in the fabrication of the negative electrode can be reduced. Thus, the electrode with higher safety and productivity can be fabricated.

The stabilized layer may include a compound other than lithium oxide. Examples of such a compound include: lithium carbonate, lithium chloride, lithium acetate, lithium bromide, lithium nitrate, lithium sulfide, lithium sulfate, and lithium carbide; organic higher polymer; and ionic liquid. These may be stacked on the stabilized layer or dispersed in the stabilized layer.

The thickness of the stabilized film is not particularly limited as long as the thickness is in the range that does not affect the battery characteristics. The thickness is not necessarily constant. The film may have various shapes.

It is easy to handle this stabilized lithium powder. This lithium powder can be handled even in a dry room with a dew point of approximately −40° C.

The composition of the stabilized lithium powder can be quantified using solid-state Li-NMR, X-ray photoelectron spectrometry, ICP (optical emission spectrometry), X-ray diffraction, or the like, and particularly using ICP.

(Method for Fabricating Stabilized Lithium Powder)

The stabilized lithium powder according to the embodiment can be fabricated by the procedure as below, for example. First, the lithium metal is heated in hydrocarbon oil at the temperature of more than or equal to the melting point. Next, the obtained melted lithium is stirred at high speed of 10000 rpm or more to be dispersed in the hydrocarbon oil. After that, carbon dioxide gas is introduced to the obtained lithium dispersion solution. On this occasion, a very small amount of powder of a conductive metal material or a metal salt including the conductive metal material is added in a predetermined range to the portion to be sprayed with the carbon dioxide gas. Thus, the powder of the conductive metal material or the metal salt including the conductive metal material is uniformly dispersed in the hydrocarbon oil in a short period of time due to the flow of the carbon dioxide gas. In this manner, the stabilized lithium powder that can improve the cycle characteristic of the battery is fabricated.

The metal lithium used as a raw material for the stabilized lithium powder may be any lithium in the state that can be used for the lithium ion secondary battery without any problem. Metal lithium with a shape of a rectangle, a particle, powder, and a foil can be used.

The hydrocarbon oil for fabricating the stabilized lithium powder may be any kind of hydrocarbon oil. The hydrocarbon oil used in the present specification mainly includes various kinds of oily liquid containing a hydrocarbon mixture. In other words, mineral oil, i.e., an oily product derived from minerals with a viscosity of such a degree that the product is regarded as oil, can be used. The hydrocarbon oil may be, for example, petroleum, shale oil, paraffin oil, or the like. The oily liquid included in the hydrocarbon oil, however, is not limited to the above. Typical examples of the hydrocarbon oil include: liquid paraffin (type S, and the industrial type) manufactured by Sanko Chemical Industry Co., Ltd.; products of MORESCO Corporation including MORESCO WHITE P-40, P-55, P-60, P-70, P-80, P-100, P-120, P-150, P-200, P-260, and P-350P; and products of KANEDA CORPORATION including HICALL M series (HICALL M-52, HICALL M-72, HICALL M-172, and HICALL M-352), HICALL K series (HICALL K-140N, HICALL K-160, HICALL K-230, HICALL K-290, and HICALL K-350) and HICALL E-7. In addition to the above, any purified hydrocarbon solvents that boil at a temperature of more than or equal to the melting point of lithium metal or sodium metal can be used.

When the lithium ingot is 1 wt %, the amount of hydrocarbon oil used here may be 1 to 30 wt %, particularly 2 to 15 wt %, from the viewpoint of the uniform dispersibility after the melting.

The temperature after the cooling of the dispersion solution may be 100° C. or less, and particularly 50° C. or less. The dispersion solution can be gradually cooled over an hour.

When the lithium ingot is added by 1 wt %, carbon dioxide gas can be added to the dispersion mixture by 0.1 to 10 wt %, particularly 1 to 3 wt %. Carbon dioxide gas may be introduced under the surface of this dispersion solution. For fabricating the dispersion solution, the stirring may be conducted sufficiently to such a degree that the dispersed metal lithium is brought into contact with carbon dioxide gas introduced onto the dispersion solution.

The temperature at which the stabilized lithium powder is fabricated may be more than or equal to the temperature at which metal lithium is melted. This temperature is specifically 190° C. to 250° C., particularly 195° C. to 240° C., and more particularly 200° C. to 220° C. When the temperature is too low, the metal lithium is solidified, which makes it difficult to make the lithium into powder. When the temperature is too high, the gasification occurs depending on the boiling point of the hydrocarbon oil, which makes the handling in the fabrication difficult.

The stirring capability for fabricating the stabilized lithium powder depends on the size and process volume of the vessel. The particles can be made into microparticles usually using any stirring device, stirring machine, and dispersing machine employed in a stirring method for achieving the desired particle diameter.

As carbon dioxide gas necessary for the fabrication of the stabilized lithium powder according to the present embodiment, high-purity carbonate gas can be used. The carbonate gas may have a concentration of 98% or more.

<Negative Electrode>

The negative electrode was fabricated by doping the negative electrode active material with the stabilized lithium powder. After that, the lithium ion secondary battery is completed. This lithium ion secondary battery has the improved cycle characteristics. The negative electrode 20 can be fabricated by forming the negative electrode active material layer 24 on the negative electrode current collector 22 as described below.

(Negative Electrode Current Collector)

The negative electrode current collector 22 is not particularly limited, and may be formed of any conductive plate-shaped material. For example, a metal thin plate (metal foil) of copper, nickel, alloy including copper and nickel, or stainless steel can be used.

(Negative Electrode Active Material Layer)

The negative electrode active material layer 24 includes a negative electrode active material, a negative electrode binder, and a necessary amount of negative electrode conductive auxiliary agent.

(Negative Electrode Active Material)

The negative electrode active material may have a large irreversible capacity. Examples of such a negative electrode active material include metal silicon (Si) and silicon oxide ($SiO_x$).

(Negative Electrode Binder)

The negative electrode binder binds the negative electrode active materials to each other and also binds the negative electrode active material and the negative electrode current collector 22 to each other. The binder may be formed of any material that enables such binding without particular limitation. Examples of such a negative electrode active material include fluorine resins such as polyvinylidene fluoride (PVDF) and polytetrafluoroethylene (PTFE). Other examples of the applicable binder include cellulose, styrene-butadiene rubber, ethylene-propylene rubber, polyimide resin, and polyamide-imide resin. Other examples of the binder include electron-conductive polymer and ion-conductive polymer. Examples of the electron-conductive polymer include polyacetylene. In this case, the binder also functions as a conductive auxiliary agent particle so that the addition of the conductive auxiliary agent is not necessary. Examples of the applicable ion-conductive polymer include the polymer that can conduct ions such as lithium ions. Examples of such a polymer include a polymer obtained by combining a monomer of a polymer compound (for example, a polyether polymer compound such as polyethylene oxide and polypropylene oxide, or polyphosphazene), and a lithium salt such as $LiClO_4$, $LiBF_4$, and $LiPF_6$ or an alkali metal salt mainly containing lithium. An example of a polymerization initiator used in the combining is a photopolymerization initiator or a thermal polymerization initiator that can be used for the above monomer.

The content of the binder in the negative electrode active material layer 24 is not particularly limited and may be in the range of 0.5 to 15 wt % relative to the weight of the negative electrode active material.

(Negative Electrode Conductive Auxiliary Agent)

The negative electrode conductive auxiliary agent is not particularly limited either, Any known conductive auxiliary agent that enables the negative electrode active material layer 24 to have the excellent conductivity can be used. Examples of such a negative electrode conductive auxiliary agent include a carbon-based material such as graphite and carbon black, metal micropowder of copper, nickel, stainless steel, iron, or the like, a mixture of the carbon material and the metal micropowder, and a conductive oxide such as ITO.

(Lithium-Doped Active Material)

The lithium-doped active material is prepared in a dry room with a dew point of −50° C. to −40° C. First, the negative electrode active material and the stabilized lithium powder are mixed in the electrolyte solution used for the lithium ion secondary battery. Next, the obtained mixture is stirred to promote the doping of the negative electrode active material with lithium.

The electrolyte solution that can be used in the preparation of the lithium-doped active material may be an organic solvent that can operate at high voltage. Specific examples thereof include aprotic solvents with a high dielectric constant, such as ethylene carbonate and propylene carbonate, and aprotic solvents with low viscosity, for example, carbonic acid esters such as dimethyl carbonate and ethyl methyl carbonate and propionic acid esters. The aprotic solvent with a high dielectric constant and the aprotic solvent with low viscosity may be mixed in an appropriate ratio.

<Electrolyte>

The electrolyte is contained in the positive electrode active material layer 14, the negative electrode active material layer 24, and the separator 18. The electrolyte is not particularly limited. An example of the electrolyte that can be used in the embodiment is an electrolyte solution containing lithium salt.

As the electrolyte solution, an organic solvent that can operate at the high voltage can be used. Examples of such an electrolyte solution include aprotic solvents with a high dielectric constant, such as ethylene carbonate (EC) and propylene carbonate (PC), and aprotic solvents with low viscosity, for example, carbonic acid esters such as dimethyl carbonate (DMC), diethyl carbonate (DEC) and ethyl methyl carbonate EMC) and propionic acid esters. The aprotic solvent with a high dielectric constant and the aprotic solvent with low viscosity may be mixed in an appropriate ratio.

The embodiment of the present disclosure has been described so far; however, the present disclosure is not limited to the above embodiment.

EXAMPLES

The embodiment of the present disclosure will be more specifically described with reference to Examples and Comparative Examples. The embodiment of the present disclosure is, however, not limited by the examples below.

Example 1

Into a flask reactor made of stainless steel, 500 g of commercial metal lithium was input at room temperature in a dry argon atmosphere. The reactor was installed in an oil bath where the thermal control was possible, Into the reactor, 2000 g of commercial hydrocarbon oil with a flow viscosity of 50.7 $mm^2/s$ (40° C.) was added. Next, the reactor was heated up to approximately 200° C. using a hot stirrer. Then, using a stirrer, it has visually been confirmed that the metal lithium was melted. Next, carbon dioxide gas was introduced at 40 ml/min for 10 seconds into the reactor. On this occasion, a very small amount of commercial Fe powder and Sr powder was added to the portion of the reaction mixture to be sprayed with the gas until the concentration shown in Table 1 was attained. Next, the mixture was stirred intensively using the stirrer to make the metal lithium into microparticles. After that, during the high-speed stirring, high-purity carbon dioxide gas was introduced at 100 ml/min for one minute while the temperature was increased by 20° C. After the gas was introduced, the heating was stopped. Subsequently, the stirring was continued until the mixture was cooled down to approximately 45° C. Then, the dispersion solution was poured into a beaker. By washing the dispersion solution with hexane three times and filtering the solution, the hydrocarbon oil was removed. The filtrate was dried using an oven, thereby removing a very small amount of solvent. The obtained powder with the free fluidity was moved to a storage bottle. Thus, the stabilized lithium powder containing the conductive metal material was fabricated.

<Measurement of Amount of Conductive Metal Material in Stabilized Lithium Powder>

The content of the conductive metal material in the stabilized lithium powder was measured by the procedure as below. First, the powder was left under the atmosphere for 72 hours and then the measurement was conducted using ICP. As a result, Fe and Sr were detected. It has been confirmed that the lithium powder contains the conductive metal material in addition to lithium. Moreover, it has been clarified that the other conductive metal material, Fe and Sr, are contained by the ratio (wt %) as shown in Table 1.

<Fabrication of Lithium-Doped Active Material>

With the stabilized lithium powder, the lithium-doped active material was fabricated through the procedure as below in a dry room with a dew point of −50° C. to −40° C. In the dry room with the dew point of 40 to 50° C., $LiPF_6$ solution of 1 M (solvent: EC/DEC=3/7 (volume ratio)) was prepared as the electrolyte solution. Into 50 parts by mass of this electrolyte solution, 100 parts by mass of the negative electrode active material (SiO) and 7 parts by mass of the stabilized lithium powder were added. By stirring the obtained mixture for 24 hours at room temperature using a magnetic stirrer, the negative electrode active material was brought into electric contact with the stabilized lithium powder. This makes the negative electrode active material doped with lithium from the stabilized lithium powder (doping step). After the obtained active material was washed with DEC, the material was dried in vacuum. Thus, the lithium-doped active material was obtained.

<Fabrication of Negative Electrode>

A slurry for forming the active material layer was prepared by mixing 83 parts by mass of the lithium-doped active material fabricated as above, 2 parts by mass of acetylene black as a conductive auxiliary agent, 15 parts by mass of polyamide-imide as a binder, and 82 parts by mass of N-methylpyrrolidone as a solvent. This slurry was applied on one surface of a 14-μm-thick copper foil as a current collector so that the lithium-doped active material was applied by 2.0 mg/cm$^2$. The slurry on the current collector was dried at 100° C., thereby forming the negative electrode active material layer. After that, roll-pressing was conducted for forming the negative electrode. Next, heat treatment was conducted in vacuum at 350° C. for three hours, thereby forming the negative electrode with the active material layer having a thickness of 22 μm.

<Fabrication of Positive Electrode>

Commercial oxide of the mixture of lithium, nickel, manganese, and cobalt with an average particle diameter of approximately 12 μm, commercial polyvinylidene fluoride (PVDF), and commercial acetylene black powder with an average particle diameter of 6.5 μm as the conductive auxiliary agent were mixed at a weight ratio of mixture oxide:acetylene black powder:PVDF=80:10:10. Then, N-methyl-2-pyrrolidone was input by a solid content of 65 wt %. This mixture in the slurry state was applied to one surface of an aluminum foil with a thickness of 20 μm. The solvent was removed from the applied mixture by drying, and then pressure molding by roll pressing was performed.

<Fabrication of Lithium Ion Secondary Battery for Evaluation>

The negative electrode fabricated as above, a counter electrode where a lithium metal foil was attached to a copper foil as the positive electrode, and a separator formed of a polyethylene microporous film held between the negative electrode and the positive electrode were input into an aluminum laminated pack. Into the aluminum laminated pack, a $LiPF_6$ solution of 1 M (solvent: ethylene carbonate/ diethyl carbonate=3/7 (volume ratio)) was poured as the electrolyte solution. Then, the aluminum laminated pack was sealed to vacuum, thereby fabricating the lithium ion secondary battery for evaluation.

<Evaluation of Cycle Characteristic>

With the secondary battery charge/discharge system (manufactured by HOKUTO DENKO CORP.), the lithium ion secondary battery fabricated as above was charged and discharged under the condition of a voltage range of 3.0 V to 4.2 V and a current value of 0.5 C. The charging and discharging through this procedure were repeated 200 times, and this is the cycle test. The ratio of the discharge capacity at the end of the test relative to the initial discharge capacity was calculated as the cycle ratio (discharge capacity after 200 charging and discharging/initial discharge capacity× 100). The average value of the cycle ratios obtained from the measurement of five batteries was evaluated as the cycle characteristic. As the value of the cycle characteristic is larger, the battery has the higher cycle characteristic. The results of the evaluation indicate that the battery according to Example 1 has the excellent cycle characteristic.

Examples 2 to 7

Stabilized lithium powder containing the components shown in Examples 2 to 7 in Table 1 was prepared by the same procedure as that of Example 1 except that the concentration of Fe and Sr as the transition metal was changed. The results indicate that, as Table 1 shows, the evaluated batteries have the excellent cycle characteristic.

Examples 8 to 12

Stabilized lithium powder containing the components shown in Examples 8 to 12 in Table 2 was prepared by the same procedure as that of Example 1 except that the concentration of Ni as the transition metal was changed. The results indicate that, as Table 2 shows, the evaluated batteries have the excellent cycle characteristic.

Comparative Examples 1 and 2

Stabilized lithium powder containing the components shown in Comparative Examples 1 and 2 in the table was prepared by the same procedure as that of Example 1 except that the concentration of Fe and Sr as the transition metal was changed. The results indicate that the batteries according to Comparative Examples 1 and 2 have the lower cycle characteristic than the batteries according to other Examples.

Comparative Example 3

For the reference, stabilized lithium powder was prepared by the same procedure as that of Example 1 except that neither Fe nor Sr as the transition metal was contained. The results indicate that the battery according to Comparative Example 3 has the remarkably low cycle characteristic, which is similar to those of Comparative Examples 1 and 2.

TABLE 1

|  | Fe (10-3 wt %) | Sr (10-3 wt %) | Fe/Sr | Cycle characteristic (%) |
|---|---|---|---|---|
| Example 1 | 0.5 | 0.46 | 1.09 | 89 |
| Example 2 | 3.8 | 4.8 | 0.79 | 86 |

TABLE 1-continued

| | Fe (10-3 wt %) | Sr (10-3 wt %) | Fe/Sr | Cycle characteristic (%) |
|---|---|---|---|---|
| Example 3 | 5.8 | 8.0 | 0.73 | 86 |
| Example 4 | 5.3 | 4.8 | 1.10 | 88 |
| Example 5 | 9.8 | 3.9 | 2.51 | 81 |
| Example 6 | 5.3 | 20.0 | 0.21 | 84 |
| Example 7 | 11.5 | 0.0 | — | 70 |
| Comparative Example 1 | 77.0 | 38.0 | 2.03 | 64 |
| Comparative Example 2 | 77.0 | 70.0 | 1.10 | 61 |
| Comparative Example 3 | 0.0 | 0.0 | — | 50 |

TABLE 2

| | Ni (10-3 wt %) | Cycle characteristic (%) |
|---|---|---|
| Example 8 | 0.5 | 88 |
| Example 9 | 2.0 | 86 |
| Example 10 | 5.1 | 86 |
| Example 11 | 6.9 | 88 |
| Example 12 | 9.0 | 81 |

By the use of the stabilized lithium powder according to the present disclosure, the cycle characteristic of the lithium ion secondary battery is improved.

The stabilized lithium powder according to the embodiment of the present disclosure may be any of the following first to third stabilized lithium powder.

The first stabilized lithium powder is stabilized lithium powder having a stabilized film containing an inorganic compound on a surface of a lithium particle, wherein: the stabilized lithium powder contains transition metal; and main transition metal, which is contained the most in the transition metal, is contained by $0.5 \times 10^{-3}$ wt % or more and $11.5 \times 10^{-3}$ wt % or less.

The second stabilized lithium powder is the first stabilized lithium powder, where the main transition metal is Fe.

The third stabilized lithium powder is the second stabilized lithium powder further containing Sr, wherein the ratio of content of Fe to Sr (Fe/Sr) is 0.21 or more and 2.51 or less.

The negative electrode according to the embodiment of the present disclosure may be a negative electrode in which any of the first to third stabilized lithium powder is deposited.

The lithium ion secondary battery according to the embodiment of the present disclosure may be a lithium ion secondary battery including the negative electrode, a positive electrode, a separator held between the negative electrode and the positive electrode, and an electrolyte solution.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A stabilized lithium powder comprising lithium particles and transition metal, wherein
   each lithium particle has a stabilized film on a surface thereof,
   the stabilized film contains an inorganic compound, and
   a main transition metal, which is at least most of the transition metal, is $0.5 \times 10^{-3}$ wt % or more and $11.5 \times 10^{-3}$ or less of the stabilized lithium powder.

2. The stabilized lithium powder according to claim 1, wherein the main transition metal is Fe.

3. The stabilized lithium powder according to claim 2, further comprising Sr, wherein the ratio of content of Fe to Sr (Fe/Sr) is 0.21 or more and 2.51 or less.

4. The stabilized lithium powder according to claim 3, wherein a part of the inorganic compound is Sr.

5. A negative electrode comprising the stabilized lithium powder according to claim 1.

6. A negative electrode comprising the stabilized lithium powder according to claim 2.

7. A negative electrode comprising the stabilized lithium powder according to claim 3.

8. A negative electrode comprising the stabilized lithium powder according to claim 4.

9. A lithium ion secondary battery comprising the negative electrode according to claim 5, a positive electrode, a separator held between the negative electrode and the positive electrode, and an electrolyte solution.

10. A lithium ion secondary battery comprising the negative electrode according to claim 6, a positive electrode, a separator held between the negative electrode and the positive electrode, and an electrolyte solution.

11. A lithium ion secondary battery comprising the negative electrode according to claim 7, a positive electrode, a separator held between the negative electrode and the positive electrode, and an electrolyte solution.

12. A lithium ion secondary battery comprising the negative electrode according to claim 8, a positive electrode, a separator held between the negative electrode and the positive electrode, and an electrolyte solution.

13. The stabilized lithium powder according to claim 1, wherein the transition metal is at least one of Ti, V, Mn, Fe, Co, Cr, or Ni.

14. The stabilized lithium powder according to claim 1, wherein the stabilized film includes lithium oxide as a main component.

15. The stabilized lithium powder according to claim 1, wherein individual lithium particles are mainly metal lithium.

* * * * *